United States Patent Office 3,150,802
Patented Sept. 29, 1964

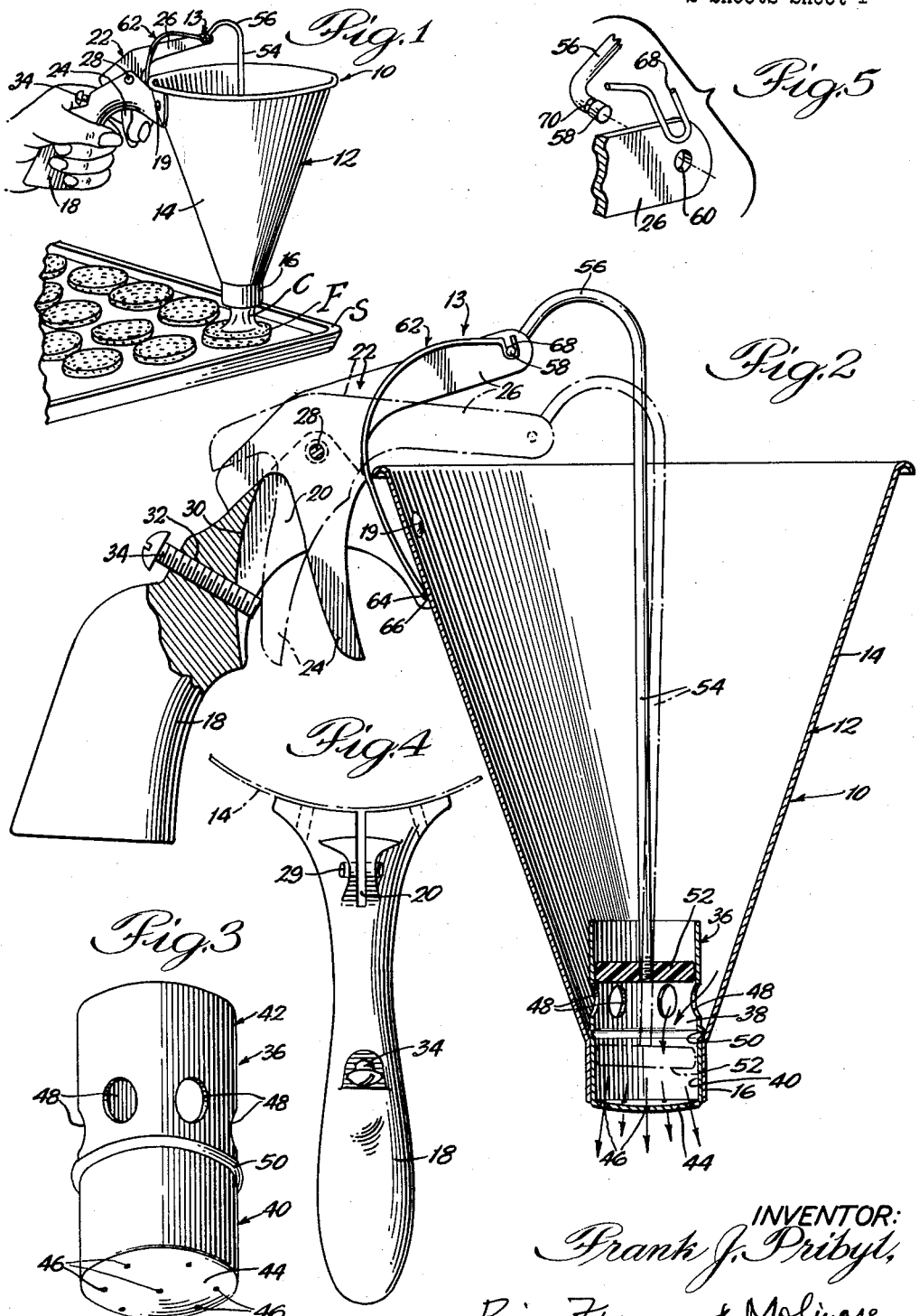

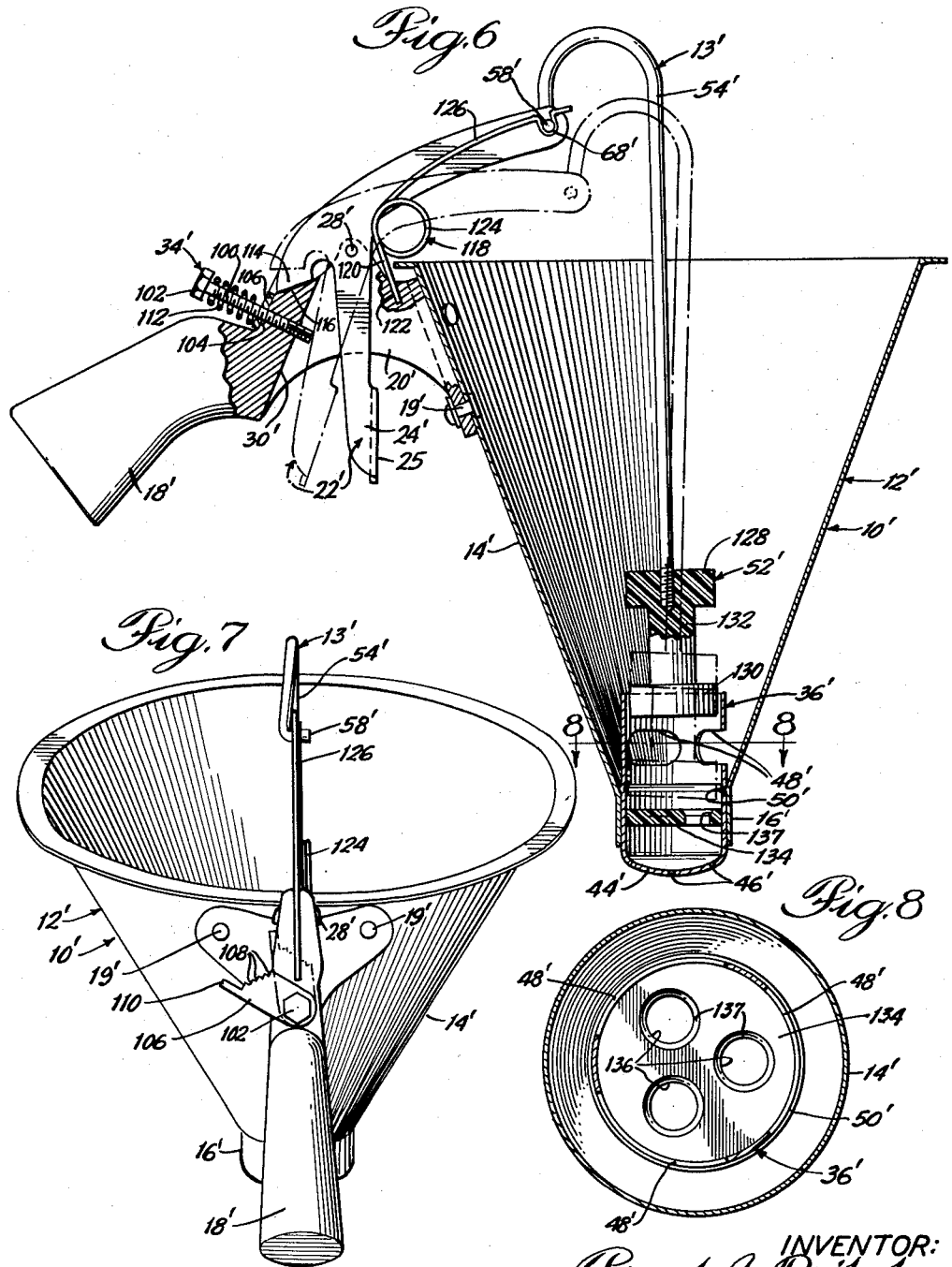

3,150,802
CONDIMENT DISPENSER WITH A PLUNGER
Frank J. Pribyl, Glen Ellyn, Ill., assignor to Ability Sheet Metal Products Company, Chicago, Ill., a corporation of Illinois
Filed Feb. 16, 1961, Ser. No. 90,163
4 Claims. (Cl. 222—309)

This application is a continuation-in-part of my copending application, Serial No. 13,554, filed March 8, 1960, now abandoned.

This invention relates to a condiment dispenser, and more particularly relates to a manually operated condiment dispenser that is particularly adapted for rapid and efficient use in a mass production cooking operation and which is characterized by its simplicity and inexpensiveness of construction.

In recent years there has been a large increase in roadside businesses which specialize in rapid, mass production of hamburgers and similar food products. In any rapid, mass production of hamburgers and similar food products, whether it be for a commercial purpose or for domestic entertaining, there exists the problem of efficiently and neatly applying to the hamburger, while it is being cooked, condiments such as mustard, catsup, finely chopped onions, and the like.

The instant invention has as its object the production of a novel condiment dispenser which is efficient to neatly apply flowable condiments such as mustard, catsup, and the like to food products such as hamburgers, and which dispenser is characterized by its simplicity and inexpensiveness of construction and by the ease with which it may be assembled and disassembled.

Another object of this invention is to provide a condiment dispenser which substantially eliminates drip of condiment therefrom when the dispenser is not in use.

Another object of this invention is to provide a condiment dispenser with improved condiment dispensing plunger means therefor which, when inoperative, may be selectively positioned to substantially prevent leakage or drip of condiment from the dispenser.

And another object of this invention is to provide a plunger operated condiment dispenser which avoids problems of air lock that are frequently normally encountered in similar devices for dispensing viscous materials therefrom.

And a further object of this invention is to provide improved plunger control means for a plunger type condiment dispenser, including improved control means for selectively setting the limits of the range of movement of the plunger.

Further objects and advantages of this invention will become apparent as the following description proceeds and the features of novelty which characterize this invention will be pointed out with particularity in the claims annexed to and forming part of this specification.

Preferred embodiments of this invention are shown in the accompanying drawings, in which:

FIGURE 1 is a perspective view illustrating a condiment dispenser which embodies the invention herein being used in a typical situation of applying condiment to one of a multiple number of food products assembled for preparation;

FIGURE 2 is an enlarged vertical cross-section view through the dispenser of FIGURE 1, and shows, in full lines, the dispensing structure when in operative position, and, in dot-dash lines, the dispensing structure in the thrust-forward position;

FIGURE 3 is an enlarged perspective view of the cup-shaped part of the dispenser of FIGURE 2;

FIGURE 4 is a top plan view of the handle structure of the dispenser of FIGURE 2 with the trigger part omitted;

FIGURE 5 is a fragmentary exploded view of the connection between the spring means, which restores the plunger to its uppermost position, and the trigger arm which acts to thrust the plunger to its forward position;

FIGURE 6 is a cross-section view similar to FIGURE 2 but showing a modified form of a condiment dispenser embodying additional improvement features;

FIGURE 7 is a perspective view of the dispenser of FIGURE 6, taken looking substantially axially of the stroke-adjusting bolt on the handle of the dispenser; and FIGURE 8 is an enlarged cross-section view taken on line 8—8 of FIGURE 6.

Referring now to the drawings, there is illustrated in FIGURE 1 a condiment dispenser, generally indicated at 10, which embodies the invention disclosed in this application. As illustrated in FIGURE 1, the condiment dispenser 10 is being manually held while dispensing condiment C from the lower end thereof onto one of a plurality of food products, which could be either buns or hamburgers, F, that are carried upon a support S. The condiment dispenser 10 includes a handled condiment reservoir means 12 and selective manually actuatable dispensing means, generally indicated at 13, for forcing the condiment C from the reservoir means 12.

Referring now with more particularity to FIGURE 2, the handled condiment reservoir means 12 includes a frusto-conical, funnel-shaped reservoir 14 which terminates at its lower end in a cylindrical sleeve 16. The frusto-conical shape is inverted, which means that the large dimension portion is at the upper end and the small dimension portion is at the lower end. A pistol-grip handle 18 is attached to the wall of the frusto-conical section 14 near its upper end by means of rivets 19, or the like. Within the handle 18 there is formed a vertical slot 20 within which is positioned a flat trigger means 22 having a finger trippable portion 24 and an actuating arm 26. The trigger means 22 is pivotally mounted for swinging within the vertical plane of slot 20 upon a pin 28 that is carried in the handle 18. The pin 28 may be a headed one whose shank is pushed through bore 29 and then upset. The rear wall 30 of slot 20 is arcuate, as best seen in FIGURE 2, to provide the requisite space within which the trigger means 22 may be swung.

The handle is provided with means for selectively adjusting the range of swing of the trigger means 22. As one type of such adjustment there is shown a threaded bore 32 through the handle extending transversely to the wall 30, and there is provided an elongated adjustment screw bolt 34 having its slotted head extending outwardly of the handle and having the tip end of its shank adapted to extend inwardly of wall 30 at varying positions, to provide an abutment, or stop, against which the finger portion 34 is arranged to move, so as to limit the range of swing of the trigger means 22 on the pin 28.

In the lower portion of the funnel-shaped reservoir means 12 there is provided an upright, elongated, cup-shaped member 36, the interior of which defines a chamber means 38 which is located adjacent the lower end of the interior of the reservoir means 12. This chamber means 38 is adapted to receive thereinto a pre-selected charge of condiment. The chamber means 38 also serves to partly separate the pre-selected charge of condiment from the remainder of supply of condiment in the reservoir 14.

The cup-shaped member 36 is divided into a lower portion 40 and an upper portion 42, and the cup-shaped member 36 also has a bottom wall 44 which is generally of dished, or convex, shape, as best seen in FIGURE 2. There is provided a plurality of apertures 46 through the bottom wall 44, and the apertures 46 are disposed so that their axes are perpendicular to the wall 44 at the region where the aperture 46 is located. This provides that the downward projections of the longitudinal axes of the apertures 46 which are not centrally located in wall 44 diverge outwardly, and this is desirable so that when the condiment passes through the apertures 46 it is spread outwardly relative to the location of the apertures 46 in the bottom of 44. This causes the condiment to be distributed over a larger area.

The upper portion 42 of the cup-shaped member 36 extends upwardly into the funnel-shaped reservoir 14 and is spaced from the inclined walls of the reservoir. Said upper portion 42 is provided with a plurality of relatively large apertures 48 therethrough, serving as port means. Between said upper and lower cup portions 42 and 40, the cup is formed to define an outwardly extending annular bead 50.

The arrangement of parts is such that when the cup member 36 is entered through the upper open end of the funnel 14, the lower portion 40 of the cup 36 slides telescopically into the sleeve 16, the location of the bead 50 is such that the bead 50 engages, or abuts, the inner walls of funnel 14 adjacent the upper end of sleeve 16, and this serves to limit telescoping of the cup 36 into sleeve 16 and positions the bottom wall 44 of the cup member 36 adjacent the lower edge of the cylindrical sleeve 16. At the same time, because of a relatively snug, or close, fit between the walls of lower cup portion 40 and sleeve 16, there exists a tendency to seal between those parts, to prevent leakage of condiment therebetween. Furthermore, the engagement of the bead 50 with the inner wall of the funnel 14 provides additional obstruction to limit leakage of condiment between cup 36 and sleeve 16.

Slidably positioned with the cup 36 is a disc-shaped plunger 52 which is adapted to be reciprocated toward and away from the apertured bottom 44 of cup 36 and which plunger is connected, by any appropriate means, such as the screw thread connection shown, to the lower end of an elongated, generally upright rod member 54. The upper end of the rod member 54 is in the form of an arc 56 which locates the upper terminus of the rod 56 at a point laterally offset from the position of the lower end of the rod 54 in the direction toward handle 18. The upper end portion of the rod 56 is then bent transversely to the plane of the remainder of the rod 54 to define a laterally extending pivot-pin portion 58 which is designed to slip through an aperture 60 formed in the extended end of the actuating arm 26 of the trigger means 22.

An elongated, restoring, wire spring member 62, having its lower end 64 hooked into a recess 66 formed in handle 28, is provided. The spring 62 is adapted to pass through the forwardmost portion of slot 20, forwardly of finger portion 24, so as to not interfere with the movement of trigger means 22 and so that the lower end 64 of the spring may be hooked into the recess 66. The other end of the spring 62 is shaped to define a hook member 68 which is adapted to detachably engage a groove 70 former in the laterally extending portion 58 of the rod 54. The engagement of the hook 68 with groove 70 positions parts of rod 54 and spring 62 on opposite sides of arm 26 and cooperates with the actuating arm 26 to retain the parts in assembled condition. Thus, spring 62 anchors at one end to fixed structure including handle 18 and operates to bias the trigger means 22 to a normal postion by the connection of its opposite end.

From the foregoing, it will be readily understood how the device herein operates. A large supply of condiment, such as mustard or catsup, is poured into the open end of funnel-shaped reservoir 14, and it will be understood that normally the spring 62 biases the parts to the full-line position seen in FIGURE 2, wherein the plunger 52 is withdrawn to its normal, first position spaced above the lower edges of the relatively large apertures 48. In the specific form shown, the plunger 52 is actually wholly above the apertures 48. The relatively large apertures 48 permit rather free flow of the condiment from the reservoir 14 through the apertures 48 into the chamber portion 38 of the cup below the plunger 52. When the finger grippable portion 24 of trigger 22 is squeezed rearwardly, the actuating arm 26, operating through rod 54, forces the plunger 52 downwardly toward cup bottom 44, as shown in dot-dash lines of FIGURE 2, and imposes a force upon the charge of condiment within the chamber means 38 of the cup 36, and this pressure operates to squeeze or dispense condiment through the apertures 46, as desired and controlled. Upon release of finger portion 24, the spring 62 retracts the parts to the normal full-line position, whereupon additional condiment will flow automatically from the supply in the reservoir 14 through apertures 48 into the charge forming chamber 38 of the cup 36.

The normal, or full-line, uppermost position of plunger 52 is fixed while the second, or dot-dash line lowermost position of plunger 52 will vary depending upon the range of swing afforded the trigger 22. Thus, the varying of the range of swing of trigger 22 varies the length of stroke of plunger 52. The plunger 52 this is arranged to be reciprocated selectively under the influence of trigger 22 between positions above and below the lowermost portion of lateral apertures 48, dispensing condiment rapidly onto a plurality of food products that may be laid out for the purposes of cooking.

The portions of the device which come in contact with the condiment, such as funnel 14, cup 36, and rod 54, are made of stainless steel or some other material that is nonreactive to foods, so as to insure the product's meeting standards of the Department of Health, or the like. The plunger 52 may be made of stainless steel or, as shown in FIGURE 2, may be made of a plastic which is nonreactive to foods.

The size of the apertures 46 in the bottom wall 44 of cup 36 is selected relative to the viscosity of the condiment within the dispenser, so that the condiment may be readily forced therethrough by the manual pressure means herein disclosed, when the manual dispensing means is manipulated, but at the same time the size of apertures 46 is such that the condiment will not leak therethrough when the dispensing means is inoperative. Furthermore, it is contemplated that a dispenser of this type would be useful for dispensing such things as finely chopped onions, and probably the apertures 46 would have to be enlarged to permit of such dispensing. It is contemplated that where a plurality of foods are to be dispensed from a single dispenser, a number of cup-shaped elements 36, having discharge apertures 46, may be provided, and the simple assembly of cup 36 in the reservoir means 12 permits of selective interchange of cleaning of those parts.

In the device of FIGURES 6-8 parts similar to those heretofore described in FIGURES 1-5 are given the same numerals with the addition of a prime mark. The condiment dispenser of FIGURES 6-8 is generally indicated at 10' and includes a handled condiment reservoir means 12', having upright funnel-defining walls, and a selectively actuable dispensing means generally indicated at 13'. More particularly, the walls of reservoir means 12' define an inverted, frusto-conical funnel-shaped reservoir 14' which terminates at its lower end in a cylindrical sleeve 16'. At the upper end of reservoir 14' is a laterally extending, pistol-grip handle 18' that is connected to reservoir 14' by means of a plurality of connectors 19', which, for example, are shown as rivets. The handle 18' is provided with an upright slot 20' therein that is defined in part by rear wall 30'. A trigger type lever means 22' is pivoted in slot 20' on a pin 28 carried by handle 18'. The lever 22' includes a finger portion 24' that is provided with a transversely bent flange part 25 for better gripping.

An adjustment screw bolt 34' is carried by handle 18' and is threaded through a bore in the handle, so that the tip end of bolt 34' projects through wall 30' into slot 20' to selected positions, the said tip being adapted for engagement by the lever means 22'. The adjustment screw bolt 34' has a shank portion 100 extending outwardly of handle 18', and a head 102 that is spaced from an abutment shoulder 104 defined on the handle 18'. A pivotly mounted lock plate 106 is provided positioned against shoulder 104 and adapted for pivoting about bolt shank 100. The lock plate 106 is provided with a plurality, or set, of steps or teeth, 108, and an elongated stop flange 110 at the high end of the series of steps 108. A compressed coil spring 112 is disposed coaxially of bolt shank 100 and abuts head 102 at one end, and abuts lock plate 106 at its other end.

The lever means 22' is provided with a rearwardly extending heel portion 114 which is adapted to move toward and away from a stop surface 116 on handle 18'. The heel 114 is never spaced further from stop 116 a distance greater than the reach of flange 110 from its pivot axis, so that plate 106 is always swung to one side relative to heel 114.

A restoring spring 118 is provided having a short arm 120 which is push-fit into a bore 122 in handle 18'. The spring 118 provides a biasing coil, or loop, 124 that is located laterally of the lever 22'. The spring 118 also provides a long arm 126 that defines at its extended end, a hook 68' that is arranged and adapted to engage a groove (not shown) in the laterally extending portion 58' of the upright rod member 54'.

Attached to the lower end of rod member 54' by any appropriate means, such as screw threads or the like, is a plunger means 52' in the form of a spool. The plunger means 52', provides a pair of axially spaced discs, including an upper disc 128 and lower disc 130 that are interconnected by a reduced stem part 132. The discs 128 and 130 are of a size to fit closely within the interior of cup member 36' and to slide therein. At all positions of the plunger means 52', at least a portion of one of the discs is slidingly located within cup member 36'.

The cup member 36' is provided with a plurality, namely, three, arcuately spaced and circumferentially elongated apertures 48'. The cup 36' is of the same general construction as cup 36 hereinabove described, and includes an outwardly extending locating bead 50' and a transverse bottom wall 44' provided with discharge apertures 46'. The apertures 46' diverge outwardly to spread the condiment being dispensed.

Positioned in cup 36' above the bottom wall 44', and spaced below the lower edges of apertures 48', is a relatively thick plate, or disc, 134 formed of plastic or the like and having therethrough a plurality of elongated apertures 136 which are of a very much larger diameter than the diameter of the discharge apertures 46'. The upper ends of apertures 136 are beveled or flared outwardly in an upward direction as seen at 137. The spacing of plate 134 below the lower edges of lateral apertures 48' is preferably, but not necessarily greater than the axial thickness of the lower disc 130 of the plunger means. This permits interposing at least a portion, if not all, of disc 130 in the cup 36' between the recesses 48' and disc 134. The disc 134 cooperates with the plunger means 52' and discharge apertures 46' to provide smooth dispensing of viscous materials such as mustard and catsup.

The operation of the device of FIGURES 6–8 will be understood from the foregoing description. The condiment within the reservoir 14' flows through apertures 48' into the cup 36' when the plunger means is in its raised position, as seen in full lines in FIGURE 6. When the trigger means 22' is manually activated to the position in dot-dash lines in FIGURE 6, the plunger means 52' acts on the condiment within the cup 36' to force the condiment through apertures 136 in disc 134 and from thence through the apertures 46' in the bottom 44'. When the plunger means 52' are raised above the apertures 48' additional condiment automatically enters the cup 36'.

To prevent drip from the device when it is not in use, the lever means 22', when in the dot-dash line position, are locked in this position by pivoting the lock member 106 until one of the teeth 108 engages the edge of heel 114 of the lever. The teeth 108 are so cut that they provide shoulders against which the heel 114 may abut under the bias of restoring spring 118. This results in the positioning of the lowermost disc 130 of the plunger means 52' in the position substantially shown in dot-dash lines in FIGURE 6, wherein the disc 130 is interposed between the lower edges of apertures 48' and the disc 134. This locking of the disc 130 in said position operates to prevent the weight of the condiment in the reservoir thereabove from exerting pressure on the remainder of the condiment within the dispensing cup 36' located below the disc 130. This arrangement prevents inadvertent drip from the device when it is not in use. The shape of the plunger means 52' in combination with the features of construction of the cup 36' as hereinabove defined operates to prevent air lock in the condiment being acted upon by the plunger means 52'.

The spring 112 provides friction producing forces on the lock plate 106 and on the bolt 34' to maintain those parts in selected positions. The bolt 34' may be adjusted to vary the stroke of the plunger means 52' under the influence of the lever means 22'.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A condiment dispenser comprising, in combination, a condiment reservoir open to atmosphere and having upright funnel-defining walls, elongated upright tubular means at the lower end of said reservoir defining an axially elongated sleeve portion, extending upwardly into the reservoir in spaced relation to the upright walls of said reservoir, and a dispensing bottom disposed at the lower end of said tubular means and extending transversely of the axis of said tubular means, said sleeve portion having lateral apertures therein spaced above said bottom and through which condiment may pass by gravity from said reservoir into the portion of said sleeve between said apertures and said bottom, elongated dispensing-plunger means defining axially spaced, substantially rigid, flanges connected by a reduced stem with one of said flanges positioned to slide in said sleeve, said plunger means being adapted for movement toward and away from said bottom, means defining the range of movement of said plunger means between an upper position, where the entire plunger means is above the lower edges of said lateral apertures to permit entry of condiment between said plunger means and said dispensing bottom, and a lower position where the said one flange on said plunger means is located between said lateral apertures and said dispensing bottom to block entry of condiment between said plunger means and said dispensing bottom, means normally raising said plunger means toward said upper position, means for selectively maintaining the plunger means in said lower position when the dispenser is not in use, a pivotable lever for selectively reciprocating said plunger means, and an adjustable stop member positioned to be engaged by said lever to selectively vary the axial stroke of said plunger means.

2. A condiment dispenser comprising, in combination, a condiment reservoir having upright funnel-defining walls, elongated upright tubular means at the lower end of said reservoir defining an axially elongated sleeve portion, extending upwardly into the reservoir in spaced relation to the upright walls of said reservoir, and a dispensing bottom disposed at the lower end of said tubular means and extending transversely of the axis of said tubular means, said sleeve portion having lateral apertures therein spaced above said bottom and through which condiment may pass from said reservoir into the portion of said sleeve between said apertures and said bottom, elongated dispensing-plunger means defining axially spaced flanges connected by a reduced stem with one of said flanges positioned to slide in said sleeve toward and away from said bottom, a lever for selectively reciprocating said plunger means, a handle secured to said reservoir, a threaded stop bolt mounted on said handle and extending therethrough, said bolt having a head at one end thereof spaced from said handle, and a tip end positioned to be engaged by said lever to selectively vary the axial stroke of said plunger means, and stepped locked means pivoted on said stop bolt and adapted to be selectively engaged with said lever to lock the plunger means in a position to dispose the said one of said flanges between said lateral apertures and said dispensing bottom to limit leakage of condiment through said bottom when the dispenser is not in use.

3. A condiment dispenser comprising, in combination, a condiment reservoir having upright funnel-defining walls, elongated upright tubular means at the lower end of said reservoir defining an axially elongated sleeve portion, extending upwardly into the reservoir in spaced relation to the upright walls of said reservoir, and a dispensing bottom disposed at the lower end of said tubular means and extending transversely of the axis of said tubular means, said sleeve portion having lateral apertures therein spaced above said bottom and through which condiment may pass from said reservoir into the portion of said sleeve between said apertures and said bottom, elongated dispensing-plunger means defining axially spaced flanges connected by a reduced stem with only said flanges positioned to slide in said sleeve toward and away from said bottom, a lever for selectively reciprocating said plunger means, a handle secured to said reservoir, a threaded stop bolt mounted on said handle and extending therethrough, said bolt having a head at one end thereof spaced from said handle, and a tip end positioned to be engaged by said lever to selectively vary the axial stroke of said plunger means, and stepped lock means pivoted on said stop bolt and adapted to be selectively engaged with said lever to lock the plunger means in a position to dispose the said one of said flanges between said lateral apertures and said dispensing bottom to limit leakage of condiment through said bottom when the dispenser is not in use, and a compressed coil spring concentric with said stop bolt and positioned between the head of the stop bolt and the lock means.

4. A condiment dispenser comprising, in combination, an upright funnel-shaped reservoir open to atmosphere and terminating at its lower end in a cylindrical sleeve, an elongated, upright, cup-shaped part having a lower portion thereof telescoped in said cylindrical sleeve, the bottom of said cup-shaped part being apertured to expose the interior thereof to atmospheric pressure, an upper portion of said cup-shaped part extending upwardly into said funnel-shaped reservoir and being spaced from the walls of said reservoir, said cup-shaped part being selectively assembled and disassembled with said reservoir to permit of selective interchange, and cleaning, of the said parts, means for limiting telescoping movement of said cup-shaped part into said cylindrical sleeve and for limiting leakage of condiment between said cup-shaped part and said cylindrical sleeve, a plunger slidably positioned in said cup-shaped part and adapted to be reciprocated toward and away from said apertured cup bottom, there being lateral apertures in the side walls of said upper portion of said cup-shaped part through which condiment may pass by gravity relatively freely, said plunger having a normal first position spaced above the lowermost portions of said lateral apertures, a handle attached to said reservoir adjacent the upper end thereof, trigger-type means on said handle for selectively reciprocating said plunger, a spring connected at one end to said handle and at its other end to said trigger-type means to bias said trigger means toward its normal position, an elongated, generally upright, rod connected at its lower end to said plunger and at its upper end to said trigger means by a pivot-pin portion of said rod extending laterally through an aperture in said trigger means, and cooperating portions of said spring and said pivot-pin portion of said rod being detachably connected for interconnecting the trigger means and the plunger, while affording easy assembly and disassembly of the parts.

References Cited in the file of this patent

UNITED STATES PATENTS

| 444,903 | Eagan | Jan. 20, 1891 |
| 1,060,500 | Salmon | Apr. 29, 1913 |
| 1,749,312 | Blair | Mar. 4, 1930 |
| 1,886,022 | Hutton | Nov. 1, 1932 |
| 1,960,731 | Drotar | May 29, 1934 |
| 2,104,990 | Hoefler | Jan. 11, 1938 |
| 2,124,580 | Lavine | July 26, 1938 |
| 2,168,493 | Plews | Aug. 8, 1939 |
| 2,566,487 | Gora et al. | Sept. 4, 1951 |
| 2,599,955 | Toman | June 10, 1952 |

FOREIGN PATENTS

| 1,091,237 | France | Oct. 27, 1954 |